Aug. 14, 1945.    J. H. HOMRIGHOUS    2,382,055
REMOTE CONTROL SYSTEM
Original Filed Nov. 28, 1939    2 Sheets-Sheet 1

INVENTOR.
John H. Homrighous

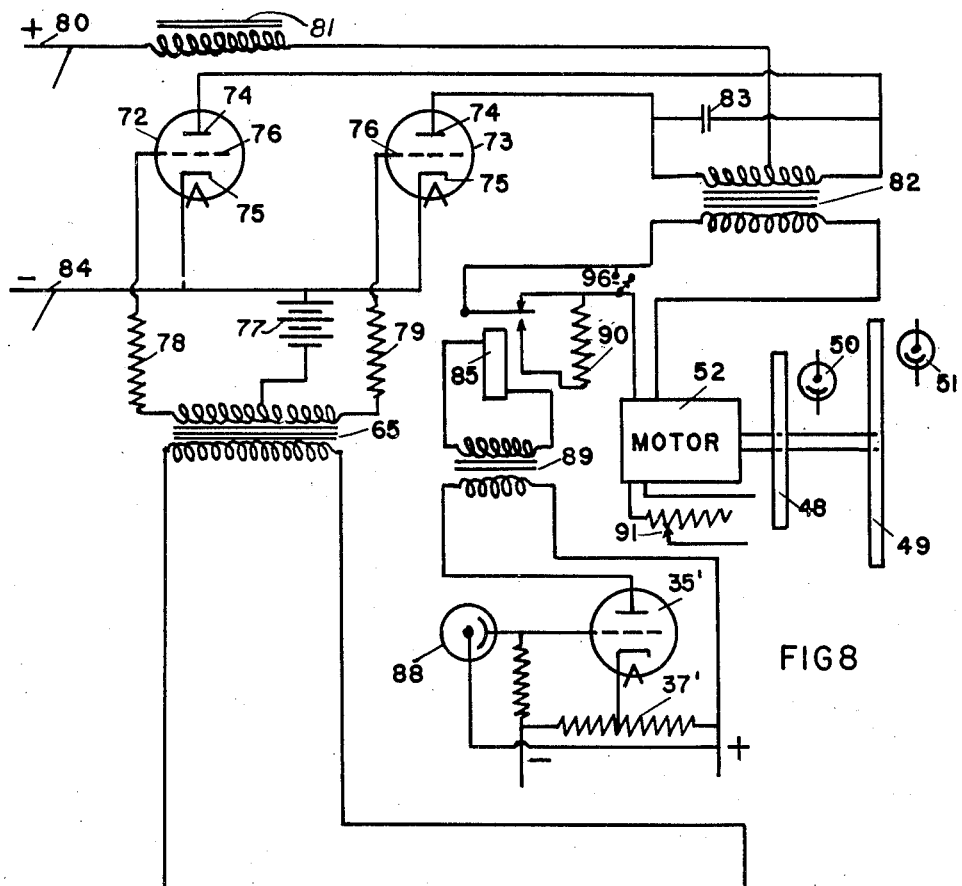
FIG 8
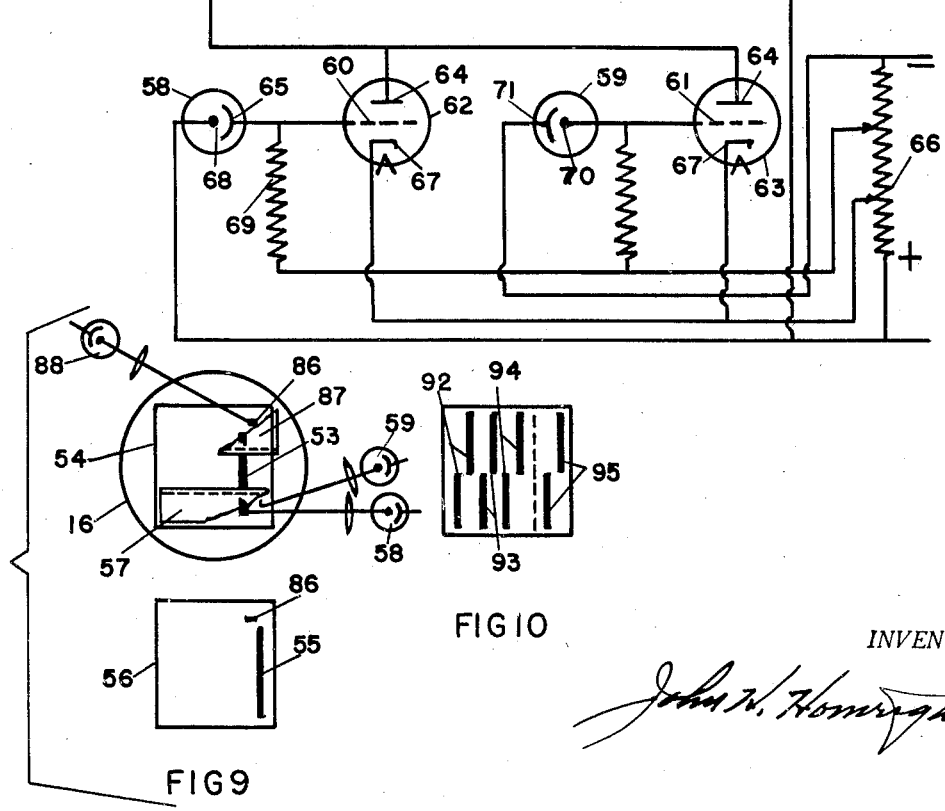
FIG 10
FIG 9
INVENTOR.
John H. Homrighous

Patented Aug. 14, 1945

2,382,055

UNITED STATES PATENT OFFICE 2,382,055

REMOTE CONTROL SYSTEM

John H. Homrighous, Oak Park, Ill.

Original application November 28, 1939, Serial No. 306,537. Divided and this application December 16, 1942, Serial No. 469,200

5 Claims. (Cl. 172—239)

My invention relates to motor control systems and more particularly to a system for operating motors or control devices at a distance.

One of the objects of my invention is to provide means for transmitting a number of control signals over a single carrier to control a plurality of motors at a distance either separately or simultaneously.

Another object of my invention is to provide means in a distant control system for transmitting control characters as video signals and for reproducing these characters at the receiver to control motors or other electrical devices.

Another object of my invention is the provision of means for starting, stopping, and otherwise controlling at a distance motors, generators and the like, and mobile equipment of air, land and water by televising certain signs or characters.

Another object of my invention is to provide means for operating a motor at a distance, from the power supply at the motor location, and at variable speeds by transmitting signals to control the frequency of alternating current supplied to the motor.

Various methods have been devised for controlling a motor at a distance. In one system a series of impulses are transmitted for energizing relays to effect controls; other methods utilized different frequencies modulated on a carrier to effect different controls. None of these systems employ video signals transmitted on a single carrier to start, stop and vary the speed of a motor or to control two or more motors simultaneously.

According to my present invention, picture signals including all control signals are transmitted and reproduced as picture or video signals, thereby greatly simplifying the equipment and circuits used for controlling one or more motors at a distance. Synchronization of the scanning operations for the cathode ray tubes are accomplished by generating the sweep frequencies at both the transmitter and the receiver, and having the voltage waves at the respective line and field frequencies generated at the receiver controlled by televising certain characters and translating these into electrical signals of proper frequencies at the receiver, and also by having the equipment for producing the characters at the transmitter definitely locked in step with its generating equipment. These frequencies are applied to produce the scanning action of the pick up tube at the transmitter and the scanning action of the viewing tube, so that the electron ray in the transmitting and receiving tubes will always be in synchronism during the scanning operation.

This invention will be better understood by referring to the following description taken in connection with the accompanying drawings in which:

Figure 8 shows a motor driven device for generating control frequencies at the receiver with circuits for controlling the motor from reproduced characters.

Figure 9 shows the control characters reproduced at the receiver.

Figure 10 shows several motor control characters at the cathode ray receiving tube.

Figure 1:
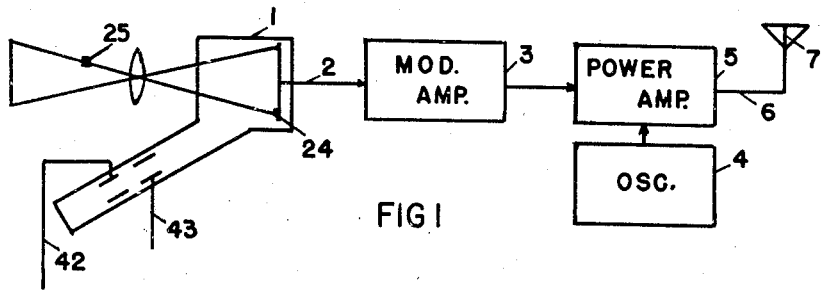
Figures 1 and 2 are simplified diagrammatic views of a television transmitting station and a television receiving station respectively, illustrating the principles of this invention.

In Figure 1 the numeral 1 designates a cathode ray transmitting tube of conventional type, and is known as an iconoscope, and as illustrated it comprises a mosaic, photo-electric screen on which a light image of the object is projected and an electron gun for generating a ray of electrons directed at the screen, and two sets of deflecting plates for deflecting the electron ray at the line and field frequencies, so that it is caused to scan the screen. The picture and certain other characters are thereby developed and fed by an output connector 2 to a modulating amplifier 3.

A carrier wave is provided by an oscillator 4. In the power amplifier 5 this carrier wave is modulated by the frequency band video or picture signals through the modulation amplifier 3. The signals from the amplifier 5 are supplied by a connection 6 to the antenna 7.

Figure 2:
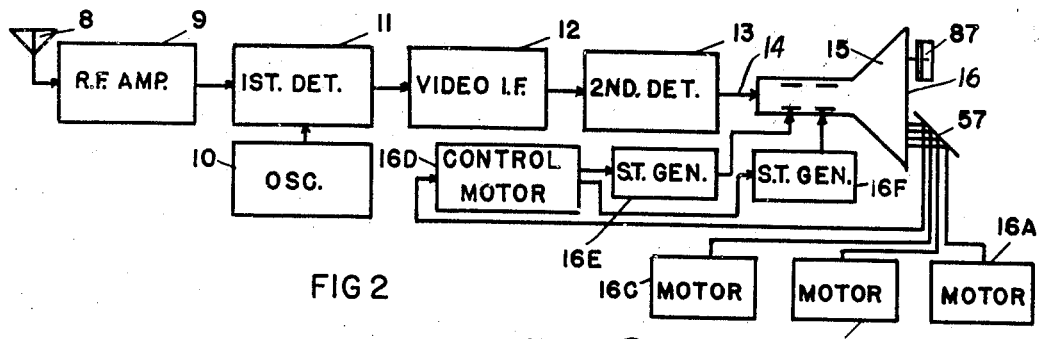

At the receiving station shown in Figure 2, the antenna 8 receives the carrier signals from the transmitter antenna 7 to a radio frequency amplifier 9. An oscillator 10 reacts with these signals in the first detector stage 11 on the heterodyne principle to produce an intermediate-frequency which is supplied to the video intermediate-frequency stage 12.

After suitable amplification, the video signal is detected at 13 and applied by a connection 14 to a scanning device 15. The device 15 is represented as being in the form of a cathode-ray tube of a conventional type and comprises a fluorescent screen 16, an electron gun for developing a ray of electrons directed at the screen, and two sets of electrostatic plates for deflecting the electron ray at the line and field frequencies to cause it to scan the screen. The video signals are applied to the control electrode of the electron gun, whereby the intensity of the electron ray is made to vary with the video or picture signals.

Several devices may be operated by light reflected from periodically changing characters appearing on the screen, such as the motors 16A, 16B, 16C and the control motor 16D for producing signals to control or trigger the frame and line saw tooth generators 16E and 16F.

Figure 3:
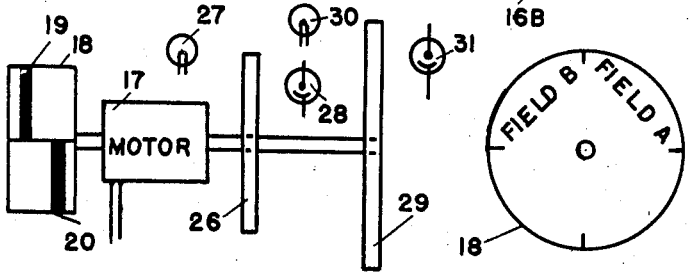
Figure 3 is a motor device for generating control frequencies and for producing certain characters for televising.
Figure 4:
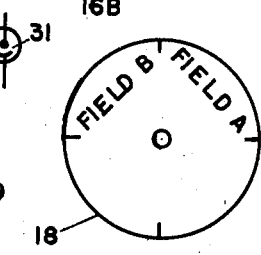
Figure 4 is an end view of one of the character forming members shown in Figure 3.
Figure 6:
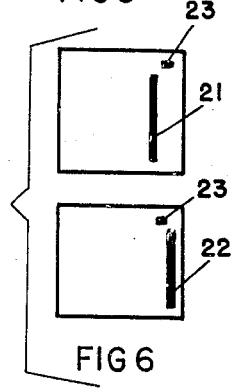
Figure 6 shows the characters for televising to synchronize the scanning operations at the receiver with those at the transmitter.

Referring to Figure 3, the numeral 17 represents a motor, having an adjustable speed, which is operated from the local power circuit, and runs at approximately 900 R. P. M. 18 is a drum having two black bands 19 and 20 each of which extends over one-half of the periphery of the drum 18 or through an angular distance of two fields as shown in Figure 4. The two bands are located adjacent the opposite edges of the drum respectively, so that by rotating the drum in front of the transmitting tube two black vertical lines will appear alternately, but separated on the mosaic, as shown in Figure 6 by the numerals 21 and 22. This drum 18 may be known as a code sender. Thus it will be seen that each mark or sign on the mosaic will be definitely identified with a frame or picture change, and also definitely related to the speed of the motor or 30 picture change for 900 R. P. M. of the motor. These marks will be reproduced in the receiver, where they will be used to generate current, for control purposes to be further explained later. Other code senders or drums similar to 18 may be employed to cause similar marks to be reproduced in the receiver.

The representation of the images shown in Figure 6, and other figures having similar representation, applying to the transmitting tubes, are shown similar to the way that they are reproduced for clearness. It is to be understood that the lens system of the transmitting tube will change the image location.

The short horizontal line 23, Figure 6, shown above the vertical control characters, is a permanent mark either on the mosaic of the transmitting tube 24, Figure 1, or outside the lens system of the tube at 25. The purpose of this short horizontal line, which is repeated in all the pictures is for automatically keeping the receivers in proper phase relation which will be more fully explained later.

The disk 26 is mounted on the motor shaft and has four holes of equal arcs apart near its periphery which are rotated past a source of light 27, directed toward the photo-electric cell 28, which generates pulses of current for controlling field scanning that are definitely tied in with the speed of the motor. That is; each revolution of the motor may produce four fields as well as four pulses, and by the adjustment of the photo-electric cell, these pulses are generated just at the exact instant required. Likewise the disk 29 is rotated by the motor 17 between a source of light 30 and the photo-electric cell 31, to generate line control pulses.

Figure 5:
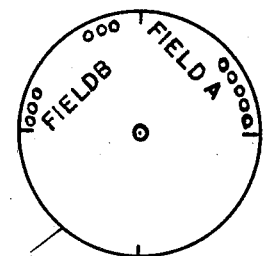
Figure 5 is an end view of disk shown in Figure 3 for generating line and other control frequencies.

In Figure 5, I have shown another view of disk 29, divided into four equal divisions which represent four fields, or two picture changes, which is easily arranged for any number of lines per field by the number of holes in each field division of disk; also by altering the position of the holes consecutive or progressive line scanning may be obtained as well as interlace of 1 to 2 ratio or 1 to 4 ratio which would also require reducing or increasing the number of openings in disk 26 for vertical scanning. As shown in Figure 5, field A has 220 openings and field B has 221 openings, so positioned that the openings in field B are advanced a distance equal to one half of the space between the holes.

From the above description, it will be seen that the pulses for controlling line scanning are definitely locked with the speed of the motor. Therefore any change in speed of the motor does not alter the number of openings per field or per frame.

Figure 7:
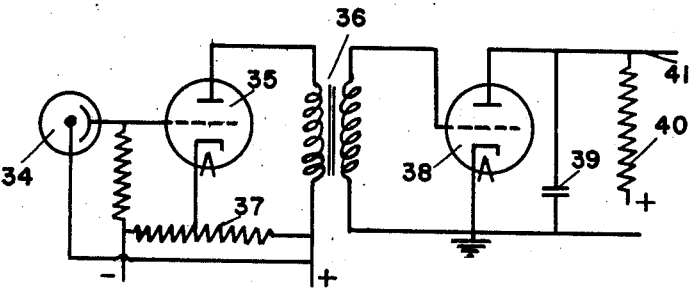
Figure 7 shows circuits for use in my invention.

A system or circuit for producing the proper sweep signals or saw tooth voltages is shown in Figure 7, which may be used in the receiver also as indicated at 16D and 16F Figure 2. In Figure 7, I have shown a photo cell 34, which may be either cell 28 or 31 in Figure 3. This cell 34 is responsive to the variation of light energy caused by the rotation of the disk 26 or 29 to cause grid excitation of amplifier tube 35. The anode of tube 35 is connected, through a winding of transformer 36, to the positive terminal of the voltage divider 37. The voltages induced in the secondary winding of the transformer 36 drive the grid of tube 38 positive, discharging the condenser 39 through the tube. Thus by alternatively charging the condenser 39 through resistance 40 and discharging it through the tube a saw tooth wave is generated. The vertical sweep frequency, controlled by disk 26, is fed through conductor 41 to the conductor 42 at the transmitting tube in Figure 1. The line sweep frequencies generated by disk 29 are transmitted through conductors 41 and 43 to the horizontal deflecting plates in the transmitting tube.

The receiver control motor arrangement shown in Figure 8 and illustrated at 16D in Figure 2, may be provided with two disks 48 and 49 and associated photo cells 50 and 51 respectively which are exactly like those shown in Figure 3 and need no further explanation. These disks and tubes together with the circuits of Figure 7 illustrated at 16E and 16F Figure 2 are for generating the sweep signals for the cathode ray receiving tube 15, Figure 2. The disks 48 and 49 are directly connected to the motor 52. Therefor the frequencies generated are directly related to the speed of the motor.

Referring to Figure 9, I have shown two frames, representing the control signals or marks, similar to those described in Figure 6. We will assume to start, that the receiver is in synchronism with the transmitter, and that the vertical lines or characters are coming through in perfect order. Therefore line 53 will be shown in frame 54 and line 55 will be shown in frame 56 on the television screen. Now as the picture is scanned from top to bottom and due to the direction of rotation of the wheel at the transmitter the line or mark will disappear later at the lower end than at any other portion of the character. Therefore rays of light are directed from these lower mark extremities on the fluoresence screen 16, by the aid of a mirror 57 and suitable lenses to the photo electric cells 58 and 59. Since these marks will alternate on the receiving tube screen in the exact likeness as they are transmitted, an alternating current may be generated in synchronism with the picture changes.

With further reference to Figure 8, I have shown circuits for producing an alternating current from the variations of light intensities occurring in the photo cells 58 and 59 which may be the same ones shown in Figure 9. These photo cells control the grid excitation of grids 60 and 61 of amplifier tubes 62 and 63. The anodes 64 are connected in parallel through the primary winding of transformer 65, to the positive side of the voltage divider 66. The cathodes 67 are connected in parallel to an intermediate point of the voltage divider. The cathode 68 of photo cell 58 is connected to the grid 60 of amplifier 62 and through resistance 69 to negative potential at the voltage divider, thereby maintaining the grid 60 at a negative potential with respect to cathode 67 and plate 64. The circuit is so arranged, therefore, that an increase in the intensity of light on the photo-cell 58 will increase the plate current of tube 62. The photo-cell 59 has its anode 70 connected to the grid 61 of amplifier tube 63, and is maintained at a positive potential with respect to its cathode 71. This causes a decrease in the plate current of tube 63, upon increasing the intensity of light directed toward the photo-cell 59. Other amplifier tubes may be connected in parallel to increase the amplification. Therefore it will be seen that the marks 53 and 55 shown in Figure 9 will alternately operate the photo-cells. Explaining this more in detail, the mark or character 53 in frame 54 does not reflect enough light into photo cell 58 to produce any effect, but the light reflected from the location of the alternate mark 55 into photo-cell 59 causes a decrease in the current value in tube 63. Next considering the frame 56, following frame 54, the line or mark 55 occurring in the opposite location does not reflect sufficient light to the cell 59 to produce any effect. However, tube 58 will receive light from the blank space previously occupied by line 53, therefore producing an increased current at tube 62. The plate circuits of tubes 62 and 63 are connected in parallel and hence a continuously rising and falling current is produced in the primary winding of transformer 65, whereby alternating voltages are induced in the secondary winding. These voltages are fed to the inverter circuit consisting of tubes 72 and 73, each of which is provided with an anode 74 and indirectly heated cathode 75 and a control electrode or grid 76. The grids 76 are normally biased negatively by a battery 77 through the resistance 78 and 79. The grid excitation voltage is supplied through transformer 65. Direct current is supplied through conductor 80, choke 81 to mid-point of primary winding of transformer 82, thence divided through the two halves of this winding to the anodes 74, a condenser 83 being connected across the primary winding of transformer 82. The cathodes 75 are connected to the source of direct current supply through conductor 84. The secondary winding of transformer 82 is connected through the contact of the control relay 85 to the motor 52 which causes the motor to run at the speed of the picture changes or in synchronism with the motor at the transmitter, producing the control characters.

With reference to Figure 9, the short horizontal line 86 is produced from the permanent mark 24 or 25 at the transmitting tube and will occur in all image fields, picture changes or frames. The purpose is to give automatic regulation for phase control. The mark 86 is located at the top and between the two marks 53 and 55 on the screen 16 of the receiving tube 15. From a point, just at left of this horizontal line 86, when in proper phase relation a ray of light is directed by mirror 87 and suitable lenses to a photo cell 88. This photo cell may be used in the circuit of Figure 8 and it is sensitive to the variations of light intensities caused by the horizontal movement of the mark 86. Should the motor 52 at the receiver get out of phase and lag behind the motor at the transmitter the line on mark 86 would move to the left blocking light from reaching the photo cell causing it to remain inoperative, however, should the motor 52 get out of phase in the opposite direction or slightly increasing its speed above that of the transmitter motor, the line 86 would move to the right, causing light to enter photo cell 88 to cause grid excitation of the amplifier tube 35'. The anode output of tube 35' may be applied through the transformer 89 to the winding of relay 85, thereby, operating relay 85 to include the resistance 90 momentairily in the motor circuit to decrease its speed, thereby correcting the phase relation.

The operation of the receiver is as follows: the motor 52 is started through the local power supply, which will produce the control frequencies including sweeps as have been described. The operator, through the rheostat 91 will slow the motor down, until the vertical control characters 53 and 55 begin to appear on the right side of the screen 16, in approximately the proper location vertically, whereupon the local power supply will be shut off, and the photo electric device will now generate electric oscillations from the periodically changing control characters on the screen to control the frequency of alternating current generated by the amplifiers 72 and 73 through the transformer 82 to the input circuit of motor 52 which will bring the motor into synchronism with the picture changes; the mark 86 will move to the extreme top of the picture as soon as the motor starts to operate from the tube supply. The line 86 may then function to adjust the horizontal scanning at the receiver in proper phase relation.

In Figure 10, I have shown three sets of characters 92, 93, and 94 in the process of changing fields and similar in all respects to the control characters 53 and 55, which may be produced at the transmitter in the same manner described for the characters 21 and 22, except that each set is controlled by a separate motor which may be operated separately and independently of each other. For instance, the set 92 may be televised to operate at the receiver another motor 16A shown in Figure 2, which may operate or control the driving motor of an aeroplane, motor car, boat, and possibly a torpedo. Another set of characters 93 may be televised to operate at the receiving station a third motor 16B to control left turn devices in the above vehicles and characters 94 may be reproduced at the receiver to operate a fourth motor 16C to control right turn devices in the above mentioned vehicles. The characters 95 may be used for synchronizing or controlling the receiver by the operation of the control motor Figure 8 as previously explained.

The motors 16A, 16B and 16C may be operated from the same source of direct current and are similar to the motor and associated circuits of Figure 8 except that the disks 48 and 49 would not be employed but instead the motor shaft would drive the propelling or steering mechanism of the mobile equipment not shown. Since phase regulation would not be employed on motors 16A, 16B and 16C, the motor input circuit may be bridged across resistance 90 at 96.

Thus from the above description it is to be understood that any of the different sets of characters 92, 93 or 94 may be stopped or started at the will of the operator at the transmitter. Furthermore, by changing the frame scanning rate the speed of the motors at the receiver is automatically changed.

The embodiments of the invention which have been given herein are illustrations of how the various features may be accomplished and of the principles involved. It is to be understood that the invention contained herein is capable of embodiment in many other forms and adaptations, without departing from the spirit of the invention and scope of the appended claims.

This application is a division of Patent Number 2,309,393 issued Jan. 26, 1943.

Having thus described my invention, I claim:

1. In a motor control system, a transmitter, means for producing a plurality of sets of different light values and for periodically interchanging the light values in each set at a point within the view of said transmitter, means for transmitting picture signals representative of said sets of interchanging light values, a receiver for producing images from said signals in which said sets of interchanging light values are reproduced along with the view, a plurality of alternating current motors at said receiver, a direct current supply circuit, apparatus and suitable circuits under the control of said sets of interchanging light values reproduced at said receiver and coacting with said supply circuit to produce alternating currents to operate said motors.

2. The system, in accordance with claim 1, in which there is provided means at the transmitter for starting or stopping any one of the said motors independently of the others.

3. The method of operating a plurality of motors which comprises transmitting from a sending station electrical signals representative of a plurality of sets of periodically changing light values over a single transmission path to a receiving station, translating the signals at the receiving station into corresponding sets of periodically changing light values controlling the frequency of alternating current supplied to said motors in accordance with the periodically changing light values, stopping and starting any one of said motors as desired by changing said electrical signals at the transmitting stations.

4. In a motor control system, a transmitting station, a receiving station, means for transmitting picture signals therebetween representative of a plurality of sets of alternating image characters, a plurality of alternating current motors at said receiving station, a direct current supply circuit, apparatus and suitable circuits under the control of said characters reproduced at said receiving station to coact with said supply circuit to produce alternating currents to operate said motors, and means for changing said characters at the transmitting station to stop and start any one of said motors without interfering with the operating condition of any of the other said motors.

5. The system in accordance with claim 4 in which there is provided means for varying the frequency of occurrence of said characters at the transmitter to change the speed of said motors.

JOHN H. HOMRIGHOUS.